United States Patent Office 2,923,581
Patented Feb. 2, 1960

2,923,581

RAILROAD JOURNAL BEARING

Arthur G. Wahrenberger, South Euclid, Ronald R. Mattingly, Euclid, and William A. Weinkamer, Willoughby, Ohio, assignors to Clevite Corporation, Cleveland, Ohio, a corporation of Ohio Application May 8, 1957, Serial No. 657,857

4 Claims. (Cl. 308—79)

This invention pertains to a journal bearing for railway cars, and more particularly to a replaceable cartridge type journal bearing especially for freight and hopper type railway cars.

At the present time one of the major cost items to the railways of the nation is the continual and frequent inspection and servicing of the wheel bearings on their trains, and the direct and indirect costs which are incurred when a bearing fails.

In order to greatly reduce the inspection and servicing costs, and in order to provide a bearing which is much less apt to fail in service, the bearing of the present invention has been developed.

It is an object of the present invention to provide a cartridge type railroad journal bearing which holds its oil supply sealed in the unit, and wherein inspection of the oil level and addition of oil is to take place only once every three years when inspection and overhaul of the brake system normally takes place. It is expected that not more than three quarters of a pint of oil will be lost during the three years of normal operation, and since the sealed unit initially contains 1½ pints of oil the bearing should operate safely over the three year period between major brake overhauls.

A further object of the invention is to provide a sealed cartridge type railroad journal bearing whose parts are easily and inexpensively replaceable when they become worn, and for the sake of overall economy, the bearing of the present invention is designed for a life of nine years of normal use without replacement of parts.

When parts have to be replaced the cost is kept to a minimum by the design of the unit wherein all parts to be replaced, such as the thrust bearings, the journal bearing, the lubricator and the seals, are all easily removable, and each constitutes a unit which is completely separate from other parts of the device.

A further object of the present invention is to provide a high quality railroad journal bearing which will require an oil addition only once every three years and which will require inspection only once every nine years, yet which is relatively inexpensive to manufacture and install on new or existing railway cars.

Another object of the present invention is to provide a cartridge type journal bearing which can economically be applied to existing railway rolling stock with a minimum of modification of the rolling stock.

Still another object of the invention is to provide a sealed railroad journal bearing containing oil which will not pump the oil out of the seal due to relative motion of the journal and bearing, and which, when applied to hopper type cars, will not lose a significant amount of oil when the car is turned upside down to empty it.

It is also an object of the present invention to provide an improved oil and dust seal for a railroad journal bearing wherein the oil seal protects the dust seal and the dust seal protects the oil seal.

Another object of the present invention is to provide journal bearing cartridges which can be preassembled on a number of axles with attached wheels prior to making the truck assembly.

For a better understanding of the present invention, together with other and further objects thereof, reference is had to the following description taken in connection with the accompanying drawings, and its scope will be pointed out in the appended claims.

With reference to the drawings there is shown in Figure 1 an isometric, partially cut-away, drawing of the railway journal bearing of the present invention.

Figure 1:
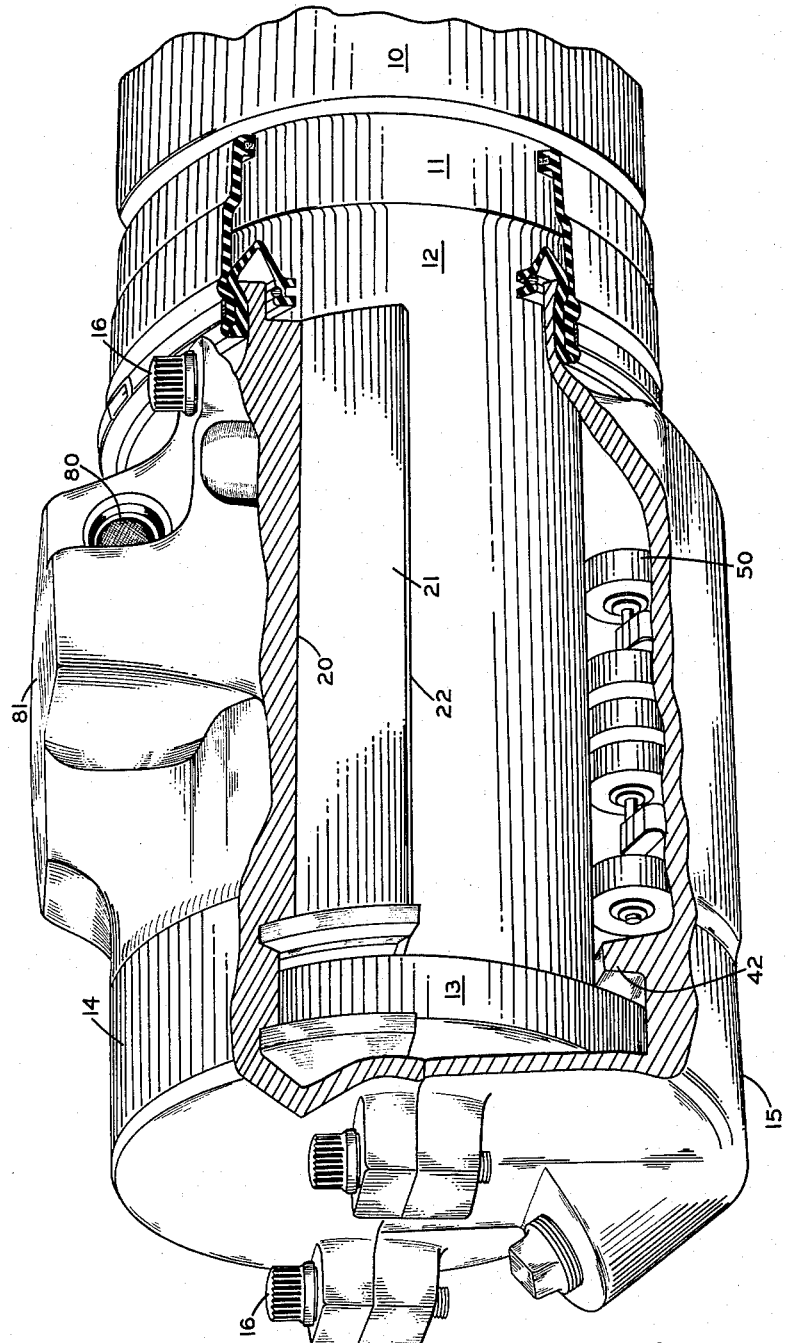

An aspect of the present invention lies in the provision of a sealed bearing housing which is to be inserted around a railroad car journal between the journal and the side frame of the car. The bearing housing comprises complementary upper and lower housing sections each formed of heavy cast metal and together having one end closed and the other end open. Means are provided for connecting the housing sections together along a sealed parting line extending parallel to the axis of the journal and with the journal extending into the open end of the housing. The upper housing section has an accurately machined seat for a sleeve bearing and a sleeve bearing insert is mounted in this seat with its two longitudinal edges firmly resting on the accurately machined parting line edge of the lower housing section. The upper housing section has a groove which is accurately machined with reference to the bearing seat for accommodating the collar on the journal, and a pair of thrust washers of bearing material are mounted only in the upper housing section on either side of the journal collar. The bottom of the lower housing section is spaced below the bottom edge of the journal forming a main oil reservoir and means are mounted between the lower housing section and the journal for transferring oil from the main reservoir to the journal, and oil sealing means are mounted on the housing at the open end for sealing between the housing and the journal. Support means form part of the heavy cast lower housing section and is spaced below the journal for supporting the journal when the car is tipped upside down, and this support means forms a separate oil reservoir in which the lower portion of the journal collar runs so that the collar lubricates the thrust washers which are located only in the upper half of the housing.

Another aspect of the invention lies in the provision of a sealed journal bearing housing for a railroad car which permits a given amount of lateral movement between the journal and the housing. The sealed bearing comprises an upper housing section and a lower housing section together having one end closed and the other end open. The housing portions are connected together with the journal extending into the open end. The open end of the housing has a continuous annular flange spaced from the journal and concentric therewith. An oil sealing means is mounted on the flange and has a portion in engagement with the journal to prevent oil leakage, and a dust guard means is secured to the annular flange and is in engagement with the journal at a location spaced inwardly along the journal from the location of the sealing portion of the oil seal by a distance at least slightly greater than the given distance of movement of the journal with respect to the housing.

With reference to the drawings, reference character 10 indicates an axle of a railway car having a given diameter. The axle has a first or dust guard seat portion 11 reduced in diameter from the given diameter and a second portion 12, called the journal, which preferably is reduced in diameter below the diameter of the axle portion 11, and which terminates at its outboard end in a thrust collar 13.

Around the journal 12 there is mounted a heavy cast metal housing formed of complementary upper and lower housing sections 14 and 15 connected together by a plurality of bolts 16 along a parting line which preferably extends in a direction parallel to the axis of the journal 12. Both of the housing sections are made of heavy cast metal. A gasket 17 is positioned between the two housing sections to facilitate sealing together the two housing sections. The outboard ends of the two housing sections 14 and 15 form a complete enclosure around the thrust collar 13 of the journal 12, and the inboard end of the housing is open to accommodate the journal 12.

Figure 3:
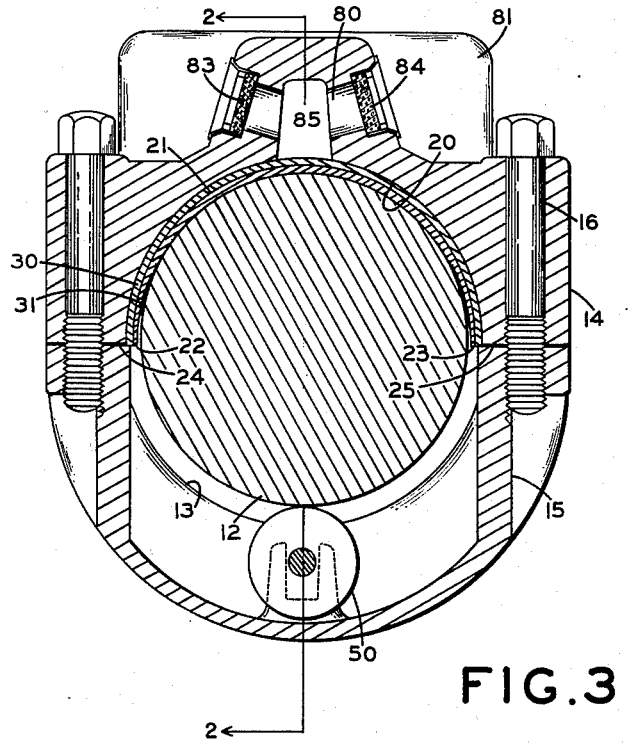
Figure 3 is a sectional view taken along line 3—3 of Figure 2.

The upper housing section 14 has an accurately machined seat 20 to accommodate a sleeve bearing 21 which is semi-circular in cross-section. The two accurately machined longitudinal edges 22, 23 of the sleeve bearing rest firmly on the accurately machined parting line edges 24, 25 of the lower housing section 15, as best shown in Figure 3. The edges of the lower housing section 15 extend inwardly beyond the edges of the upper housing section 14 by a small amount which is approximately equal to the thickness of the steel shell 30 which backs the bearing material 31, the steel shell and the bearing material 31 which is adhered thereto forming a unitary sleeve bearing which is easily replaceable in the housing in the event the bearing material becomes worn. An aligning pin 35 is provided in the upper portion of the housing section 14, and it extends through a hole in the bearing 21 to align the bearing in its accurately machined seat 20. When the two heavy housing sections are bolted together "crush" is applied to the sleeve bearing to force the steel shell 30 firmly into the seat 20 and to hold it firmly in place.

At its outboard end the upper housing section 14 has a groove 36 which is wide and which has two accurately machined grooved portions 37, 38 into which replaceable thrust washers 39 and 40 are positioned with their lower edges resting on the parting line surface 25 of the lower housing section 15. Each of the thrust washers 39, 40 preferably is formed of a steel backing portion with an integral bearing metal face portion in position to engage the thrust collar 13 as the journal and collar move axially in and out of the housing 14, 15.

It is essential to an economical journal bearing formed of two heavy cast metal halves to have the thrust washers 39, 40 mounted in the upper half of the housing with the sleeve bearing 21. The reason for this is that the seat 20 for the sleeve bearing must be accurately machined, and the slots or grooves 37, 38 within which the thrust washers are mounted must be accurately machined with respect to the sleeve bearing seat so that the planes they lie in are substantially perpendicular to the longitudinal axis of the sleeve bearing. Any substantial deviation from this accurate relationship leads to off-center wear of the thrust washers with consequent short bearing life. To accurately machine the seat 20 for the sleeve bearing and the thrust washer grooves 37, 38 in the upper half of the housing is no great task since only a single set-up of the housing half on the equipment for machining the required surfaces is required. If the thrust washers were mounted in the bottom half of the housing the bottom half would have to have very accurate grooves for the thrust washers. The expense of aligning the lower housing half very accurately so that its thrust washer grooves defined planes perpendicular to the axis of the sleeve bearing in the upper half of the housing is considerable. Consequently, for the sake of economy, the thrust washers should be positioned in the upper half of the housing. This by itself is not a new concept, but the prior art has not solved the problem of adequately providing lubrication to thrust washers placed in the upper half of the housing.

In the present invention oil in adequate quantities is supplied to the thrust washers by the rotating thrust collar 13 whose lower portion runs in a secondary oil reservoir 40 which is separate and distinct from the main oil reservoir 41. The lower half 15 of the housing includes a support device 42 extending across the bottom of the housing just inboard of the journal collar 13 and spaced a slight distance below the journal 12. This support device 42 forms the secondary oil reservoir 40 at an elevation above the floor of the main reservoir 41. There is no direct connection from reservoir 40 to reservoir 41 as it is not desired to have reservoir 40 drain into reservoir 41.

Means such as the spring biased felt roller device 50 is mounted in the bottom of the housing and is maintained in contact with the underneath surface of the journal 12 to apply lubricant thereto. Lubricant from the journal fills the reservoir 40 and the lower edge of the collar 13 runs in the oil in reservoir 40 and carries the oil continuously to the thrust washers 39, 40. The lower half of the housing includes a passageway 43 with a threaded plug 44 mounted therein, and the floor of the passageway is level with the floor in the oil reservoir 41. Thus if the oil level is to be checked the plug 44 is removed and the inspector can immediately determine the oil level in the main reservoir, and he knows that the oil level in the secondary reservoir 40 is higher.

The inboard end of the journal is sealed against loss of oil and against the entrance of dust and dirt by a unique sealing device which is mounted on an annular flange 60 which is part of the housing. It is very important to long-life oil and dust sealing that the annular flange 60 be concentric to within a few thousandths of an inch with the journal 10 and with the portion 11 of the axle 10. Also, both the journal and the portion 11 of the axle must be round to within a few thousandths of an inch, and of course the seal contacting surfaces must be smooth. Failure to observe these fairly close tolerance leads to excessive oil leakage and permits dust to get into the sealed portion of the housing with consequent early deterioration of the bearing.

Figure 5:
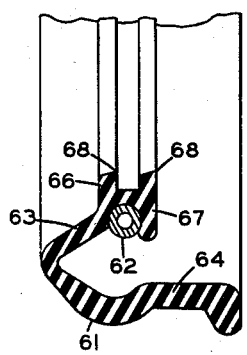
Figure 5 is a sectional view of a portion of the oil seal.

An oil seal device 61 which is substantially U-shaped in half cross-section is mounted with one of its legs 64 on the outside of the flange 60 and with its other leg 63 doubled back to a position between the journal and the flange. A garter spring 62 extends around the annular oil seal device 61 in contact with the inside surface of the leg 63 urging the two wiper feet 66, 67 against the journal 12. It is to be seen in Figure 5 that the ends of the wiper feet extend at an angle to the surface of the journal. It has been found that best results are obtained when this angle is between 5 and 15 degrees. A lesser angle than 5 degrees results in leakage due to insufficient pressure of the tip of the foot 68 against the journal with consequent oil leakage as well as increased heat build-up, and increasing the pressure of spring 62 does not cure this defect. A greater angle than 15 degrees results in too great pressure of the tip of the foot against the journal leading to rapid wear and deterioration of the seal with subsequent oil leakage. It has also been found that the outside diameter of the flange 60 should be about 1/8" larger than the internal diameter of the seal and the spring in their natural or free state. The seal is made of abrasion resistant Buna-N rubber, also known under the Goodrich trademark "Hycar," and the I.D. of the rubber seal and the spring in their free state should be .1" to .3" smaller than the O.D. of the journal. With these dimensional relationships the effectiveness of the oil seal is high and remains high over the required three year period, losing not more than about 3/4 of a pint of oil in the three year period if the journal at the location of the oil seal is maintained relatively free of dust and dirt. If the portion of the journal in contact with the oil seal is allowed to become dusty even high abrasion Hycar will not last the required length of time. Consequently a dust seal is provided inboard of the oil seal and spaced therefrom by a distance greater than the distance of the relative motion of the journal with respect to the housing.

Figure 4:
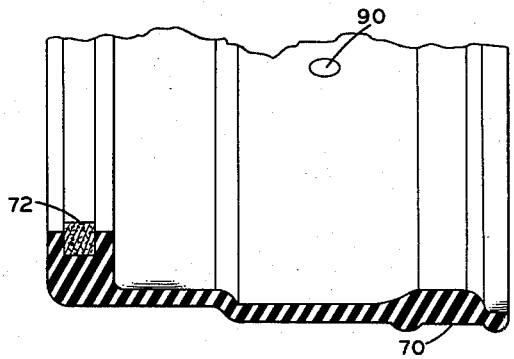
Figure 4 is a sectional view of a portion of the dust seal.

The dust seal is shown in detail in Figure 4 and comprises an annular member made of neoprene rubber. It has a portion 70 which is mounted around the leg 64 of the oil seal and a metal band 71 holds both the oil seal and the dust seal to the metal flange 60. The inboard end of the annular rubber portion of the dust seal terminates in a bifurcated portion having a felt ring 72 mounted therein for contact with the portion 11 of the axle.

Because of the spacing between the dust seal and the oil seal the portion of the axle 11 which engages the dust seal cannot come in contact with the oil seal and consequently fine dust and dirt particles at the location of the dust seal do not get a chance to abrade the oil seal.

Hycar rubber is very resistant to oil deterioration and is able to sustain relatively high temperatures for periods of time without heat-checking. Since it is in frictional contact with the rotating journal it must have this heat resistant property. However, Hycar is not highly resistant to deterioration due to the natural elements. It is to be noted that in the seal of the present invention the Hycar oil seal unit is completely protected from the elements by the neoprene dust guard and that consequently the weakest quality of the oil seal is adequately protected. Also, while neoprene is highly resistant to the elements it is not highly resistant over long periods of time to oil and heat. In the assembly shown the oil seal protects the dust seal against prolonged contact with large quantities of oil and thereby extends the life of the dust seal.

With the substantially complete sealing of the journal within the housing it becomes very important to vent the housing. This need arises due to the "piston-like" action of the journal as it moves in and out of the housing by a distance up to about ⅞ of an inch. Each longitudinal movement of the journal results in displacement of a quantity of air. In order to keep this displaced air from breaking through the oil seal with consequent oil pumping, a vent 80 has been provided into the housing for venting the inside of the housing to atmosphere.

The vent 80 is located at the top of the housing section 14 behind the thick cross-shaped load bearing member 81 so that the vent is almost completely protected from the elements when the journal housing is in place in a railroad journal box. Also, this location is important since it lies behind the sleeve bearing 21 at the top of the unit where the velocity of the oil particles moving around in the housing is at a minimum, and consequently pumping air in and out of the vent at this location causes less loss of oil.

The vent 80 comprises two sintered metal discs 83, 84 pressed into the housing section 14 and in communication with passageway 85, which in turn is in communication with passageway 86 opening to the annular space behind the annular oil seal. The sintered metal discs have a plurality of openings of such a size as to exclude all dirt particles which are .005" or larger in size. Some of the smaller size particles will also be excluded by the filters, not not completely. However, the bearing metal, which may be babbitt, has the ability to absorb dirt particles of a small size if it has to.

Figure 2:
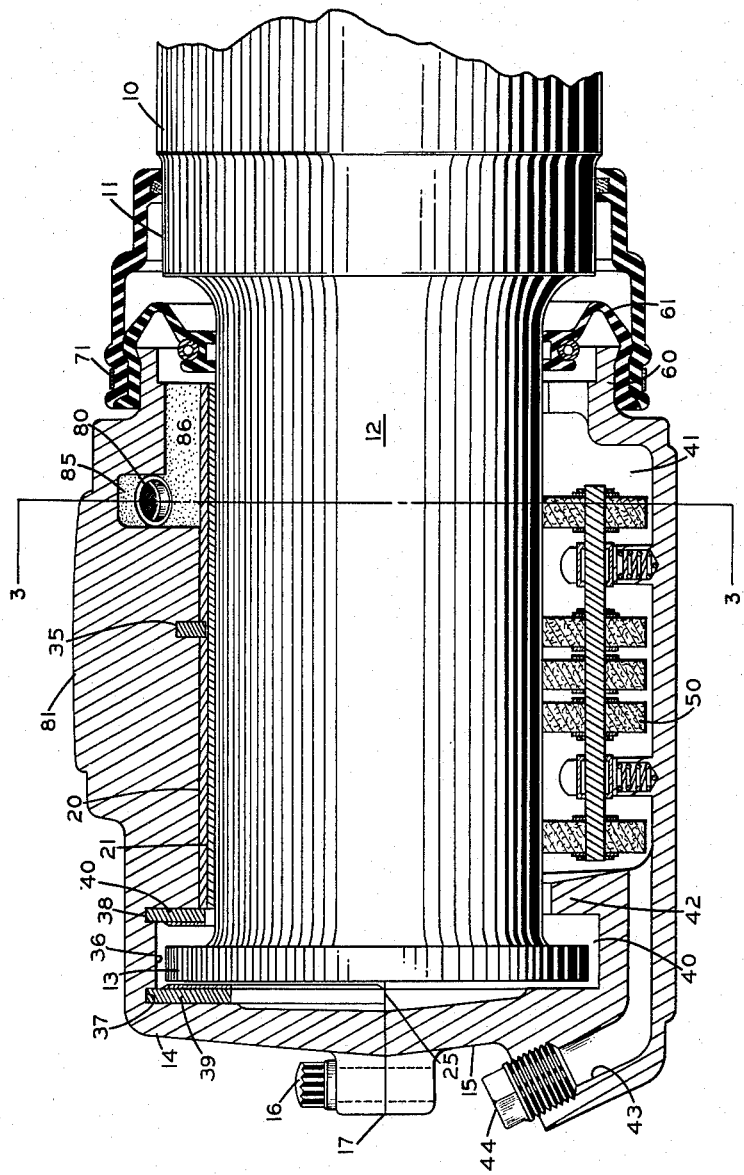
Figure 2 is a sectional view of the bearing taken along line 2—2 of Figure 3.

When the axle 10 on which the oil and dust seals are mounted has a change in diameter located between the two seals, as is shown in Figures 1 and 2, it is advisable to vent the interior as by a small hole 90 in the dust seal. This prevents a pumping action due to the movement of the journal in and out of the seal. The vent 90 may be open or it may embody a filter such as a porous metal disc similar to discs 83, 84. It is desirable to locate the vent 90 at about 45 degrees to a vertical line through the journal. In this position dirt from above does not fall onto or in the vent. Also, a small trace of oil may gather in the bottom of the space between the oil seal and the dust seal. This trace of oil is sufficient to attract and hold any dust particles which come in through the vent preventing undue abrasive action at the oil seal.

The device of the present invention may be installed on a railway freight car by modifying the present integral box or separable box side frame, approved by the Association of American Railroads, to the extent of removing the waste ribs and dust guard framework flush with the inside surface of the journal box, and cutting off the front of the box at the lid hinge parallel to the dust guard end of the journal box. This device may also be installed on railway freight cars having narrow and wide jaw pedestal side frames approved by the Association of American Railroads. Narrow jaw pedestals require the addition of a lug on each jaw to engage the recesses on the sides of the journal box bearing cartridge. Wide jaw pedestals require an adapter which engages the pedestal jaws on its outer contour and engages the journal box bearing cartridge on its inner contour. A retainer bar is secured to the bottom of one jaw on both types of side frames and extends partially under the journal box bearing cartridge to retain the cartridge in the pedestal jaws when the pedestal side frame is raised upward.

The present invention may be installed on standard freight car axles designated by the Association of American Railroads. The journals are to be machined to within .005" of the designated journal diameter and rolled or ground to a 20 microinch finish. The journal collar faces are to be smooth, parallel and square with the journal axis. Dust guard seats 11 are to be turned to within .005" of the designated seat diameters and are to have a smooth finish. Also, the dust guard seat portion 11 of the axle must be concentric with respect to the journal portion 12 or the seals will be ineffective. When the above relationships are observed the journal bearing of this invention should run in normal service for three years without addition of oil and it should run for nine years without inspection or replacement of parts.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

We claim:

1. A sealed bearing housing to be inserted between a railroad car journal having a collar and the journal box, comprising, in combination, an upper housing section and a complementary lower housing section each formed of heavy cast metal and together having one end closed and the other end open, means connecting said complementary sections together along a sealed parting line extending parallel to the axis of said journal with said journal extending into said open end, said upper housing section having an accurately machined seat for a sleeve bearing, a sleeve bearing insert having two longitudinal edges accurately mounted in the said seat in the upper housing section with its said longitudinal edges firmly resting on accurately machined parting line edges of said lower housing section, the bottom of said lower housing section being spaced below the bottom edge of said journal forming a main oil reservoir therein, means mounted between said lower housing section and said journal for transferring oil from said main reservoir to said journal, oil sealing means mounted on the said housing at the open end thereof for sealing between said housing and said journal, a groove in said upper section of said housing accurately machined with reference to said bearing seat for accommodating said collar on said journal, a pair of thrust washers of bearing material mounted only on said upper housing section in said groove on either side of said journal collar, and support means forming part of said lower housing section spaced below said journal for supporting said journal when the car is tipped upside down or when the car is picked up in such a manner that the journals drop with respect to the car, said support means being located inboard of said collar on said journal and extending across said lower housing section in a direction perpendicular to the longitudinal axis of said journal forming a secondary oil reservoir in which the collar of said journal is positioned whereby, upon rotation of said journal the collar carries oil to said thrust washers in the upper section of said housing, the bottom of said secondary oil reservoir being at an elevation above the bottom of the main oil reservoir whereby oil transferred from the reservoir to the journal, even when the reservoir is substantially empty, is effective to maintain a supply of oil in the secondary reservoir.

2. A sealed bearing housing as set forth in claim 1, further characterized by lubricating means mounted in said main oil reservoir for supplying oil to the underneath surface of said journal in quantities sufficient to cause said secondary oil reservoir to receive excess oil from said journal.

3. A sealed bearing housing as set forth in claim 2, further characterized by said pair of thrust washers engaging said lower housing section to prevent motion of said washers.

4. A sealed bearing housing as set forth in claim 3, further characterized by said second oil reservoir being free of a drain connection to said main oil reservoir.

References Cited in the file of this patent

UNITED STATES PATENTS

| | | |
|---|---|---|
| 797,129 | Layton | Aug. 15, 1905 |
| 1,245,586 | Hennessy | Nov. 6, 1917 |
| 1,327,429 | Homes | Jan. 6, 1920 |
| 2,718,438 | Sprouse | Sept. 20, 1955 |
| 2,720,431 | Browne et al. | Oct. 11, 1955 |

FOREIGN PATENTS

| | | |
|---|---|---|
| 1,081,818 | France | June 16, 1954 |